Patented May 25, 1954

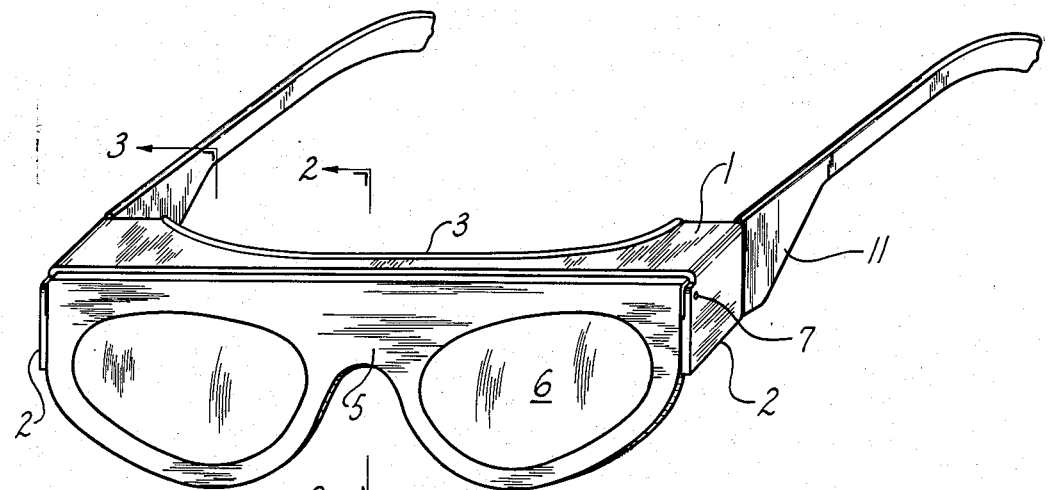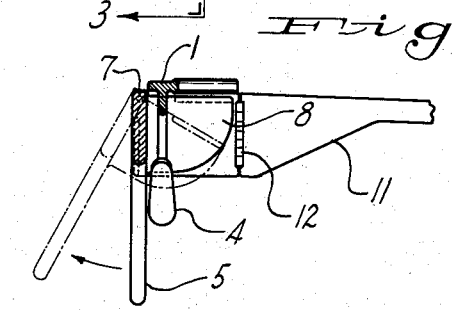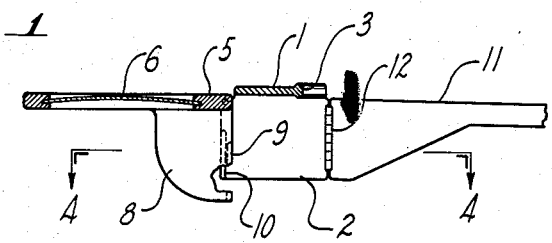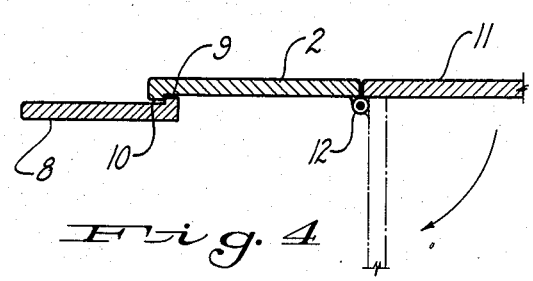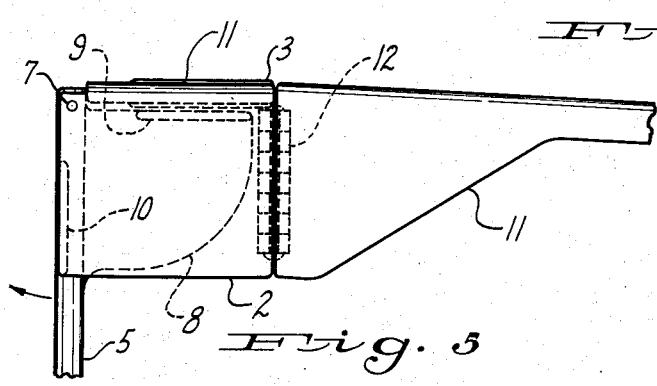

2,679,191

UNITED STATES PATENT OFFICE 2,679,191

EYEGLASS

Michael H. Tomlin, Pittsburgh, Pa.

Application March 27, 1951, Serial No. 217,819

2 Claims. (Cl. 88—41)

This invention relates to eye glasses and it is among the objects thereof to provide eye glasses of a construction which shall particularly adapt them for use as sun glasses excluding undesirable light rays, and because of their construction also adapts them for use as safety eye glasses or goggles.

It is among the objects of the invention to provide eye glasses in which the glasses may be tilted out of the line of vision without removing the frames from the head of the wearer.

It is another object of the invention to provide an eye glass in which the glass frame is hinged to a main frame shaped to conform to the contour of the forehead and having side walls for excluding light which also constitute a substantial support for hinging the ear bars thereto.

The invention will become more apparent from a consideration of the accompanying drawing, constituting a part hereof, in which like reference characters designate like parts, and in which:

Fig. 1 is a view in perspective of eye glasses embodying the principles of this invention;

Fig. 2 is a cross-sectional view partially in elevation taken along the line 2—2, Fig. 1;

Fig. 3 is a cross-sectional view partially in elevation taken along the line 3—3, Fig. 1;

Fig. 4 is a cross-sectional view taken along the line 4—4, Fig. 3; and

Fig. 5 is an enlarged detail and side elevation of a portion of the main frame, side wall and hinged ear bars.

With reference to the several figures of the drawing, the numeral 1 designates a main frame which may be made of light weight metals, plastic, or any other suitable material, having a pair of integrally formed side walls 2 and a top wall terminating in a beaded edge 3 shaped to the contour of the forehead. As shown in Fig. 2 a nose piece 4 is mounted to the main frame 1 whereby the frame 1 is supported on the nose independently of the frame 5 that carries the eye glasses, designated by the numeral 6, which may be tinted glasses of the antiglare type. The glass frame 5 is hinged to the main frame 1 as shown at 7, Figs. 1 and 2, whereby it may be tilted as illustrated in Fig. 2 by the dotted line, the glass frame being shown in a horizontal position in Fig. 3.

For the purpose of excluding light, the glass frame 5 is provided with segment shaped members 8, Figs. 2 and 3, having a shoulder 9 which is partially cut away in Fig. 3, which, in the extended position of the glass frame as shown in Fig. 3, abut against similar shoulders or beaded ends 10 of the side walls 2 of the main frame 1. The member 9 also serves to maintain frictional contact with the side wall 2 to prevent looseness of the frame 5 and to hold it to any angular position to which it may be adjusted. When the eye glass frame is in the normal position as shown in Figs. 1 and 5, the bead or flange 10 of the side wall 2 excludes light from the joint between the eye glass frame 5 and the side wall 2, the latter edging flush with the eye glass frame when in the down position as shown in Fig. 1.

Ear bars 11 are hinged to the side walls 2 by the hinge 12 and are provided with wide ends of substantially the height of the side walls 2 to shade the eyes from the side, the side walls 2 and the enlarged end of the ear bars 11 extending back to the face of the wearer. The hinge construction 12 is such as to maintain a rugged joint that will not loosen from use, a piano hinge being employed for this purpose. The relationship of the segment flange 8 to the side wall 2 and the relationship of the flanges 9 and 10 is more clearly shown in Fig. 5 of the drawing, and their coaction is their extended position, whereby the flanges 9 and 10 abut, is shown in Fig. 4 of the drawing.

In use the glasses are supported by the nose piece 5, Fig. 2, on the nose of the wearer with the glass frame vertical as shown in Fig. 1 and in the full lines in Fig. 2. In this position with the contour edge 3 extending to the forehead of the wearer and the side walls 2 and enlarged portion of the ear bars 11, all light is excluded except such as may be reflected from beneath the eye glass frame. If the wearer desires to have a clear vision without the tinted glasses, he simply raises the eye glass frame to the horizontal position as shown in Fig. 3, and in that position the eye glasses and eye glass frame function as a shade while giving clear vision to the wearer. In this position the side walls 2 and the ear bars 11 also shade the side of the eyes against glare so that there is considerable advantage in employing the glasses in the manner shown in Fig. 3 when it is desirable to scrutinize objects or reading matter without interference of the tinted glass. In normal use with the eye glass frame 5 in the vertical position, all light is excluded from the top, front and sides to the great comfort of the wearer.

Although one embodiment of the invention has been herein illustrated and described, it will be evident to those skilled in the art that various modifications may be made in the details of construction without departing from the principles herein set forth.

I claim:

1. In an eye glass, a main frame having a contour conforming shade portion having integral end walls extending vertically downward at right angles and having an integral nose support, eye lenses mounted in a separate frame hinged at the top in the upper inside part of said integral end walls, the hinge edge of said lens frame being co-extensive with the edge of said main frame and slightly below the contour forming shade portion of the main frame, and side bows hinged to said main frame at the back end of the end walls, said side bows having side walls of the same width as the vertical end walls of the main frame adjacent the hinged end to exclude light at the sides of the eye glasses and terminating in relatively narrow temple pieces.

2. In an eye glass, a flat main contour shade portion of a frame having integral end walls extending vertically downward at right angles to the flat main portion and having an integral nose support, eye lenses mounted in a separate frame hinged at the top to the end walls of the main frame, the hinge edge of said lens frame being co-extensive with and placed just below the top edge of the main frame to which it is hinged to exclude light, and side bows hinged to said main frame at the back end of the end walls, said lens frame having inwardly extending guide pieces at the ends sliding just inside the end walls of said main frame, the guide pieces having shoulders to bear evenly on the inside end walls of the main frame at various angular positions of the lens frame to hold the eye glass frame in adjusted angular position, said end walls and said shoulders constituting stops when the eye glass frame is in its upper position.

References Cited in the file of this patent

UNITED STATES PATENTS

| Number | Name | Date |
|---|---|---|
| D. 112,989 | Diodati | Jan. 24, 1939 |
| D. 136,847 | Cardona | Dec. 14, 1943 |
| 1,963,437 | Gray | June 19, 1934 |
| 2,506,956 | Gormez | May 9, 1950 |
| 2,526,582 | Rowan | Oct. 17, 1950 |

FOREIGN PATENTS

| Number | Country | Date |
|---|---|---|
| 580,798 | Germany | July 17, 1933 |